United States Patent
Yamada et al.

(10) Patent No.: US 10,984,096 B2
(45) Date of Patent: Apr. 20, 2021

(54) SYSTEMS, METHODS, AND APPARATUS FOR DETECTING CONTROL FLOW ATTACKS

(71) Applicant: Intel Corporation, Santa Clara, CA (US)

(72) Inventors: Koichi Yamada, Los Gatos, CA (US); Sevin F. Varoglu, Santa Clara, CA (US); Ajay Harikumar, San Jose, CA (US); Alex Nayshtut, Gan Yavne (IL)

(73) Assignee: Intel Corporation, Santa Clara, CA (US)

( * ) Notice: Subject to any disclaimer, the term of this patent is extended or adjusted under 35 U.S.C. 154(b) by 605 days.

(21) Appl. No.: 15/938,015

(22) Filed: Mar. 28, 2018

(65) Prior Publication Data

US 2019/0042730 A1 Feb. 7, 2019

(51) Int. Cl.
*G06F 21/52* (2013.01)
*G06F 21/55* (2013.01)
*G06F 21/56* (2013.01)

(52) U.S. Cl.
CPC ............ *G06F 21/52* (2013.01); *G06F 21/554* (2013.01); *G06F 21/566* (2013.01); *G06F 2221/033* (2013.01)

(58) Field of Classification Search
CPC ...... G06F 21/52; G06F 21/554; G06F 21/566; G06F 2221/033
See application file for complete search history.

(56) References Cited

U.S. PATENT DOCUMENTS

| | | | | |
|---|---|---|---|---|
| 2013/0024676 A1* | 1/2013 | Glew | ................ | G06F 9/30076 712/244 |
| 2013/0276056 A1* | 10/2013 | Epstein | ............... | G06F 9/45558 726/1 |
| 2015/0067763 A1* | 3/2015 | Dalcher | ................ | G06F 21/566 726/1 |

(Continued)

OTHER PUBLICATIONS

Intel Corporation, "6th Generation Intel® Core Processor Family Uncore Performance Monitoring Reference Manual", Apr. 2016, 20 pages.

(Continued)

*Primary Examiner* — Alexander Lagor
*Assistant Examiner* — Forrest L Carey
(74) *Attorney, Agent, or Firm* — Trop Primer & Hu, P.C.

(57) ABSTRACT

After a heuristic event counter in a processor has triggered a performance monitoring interrupt (PMI) when the processor was executing a target program in user mode, and after the processor has switched to kernel mode in response to the PMI, a heuristic event handler automatically performs preliminary analysis in kernel mode, without switching back to user mode, to determine whether heavyweight code analysis is warranted. The preliminary analysis comprises (a) obtaining an instruction pointer (IP) for the target program from a last branch record (LBR) buffer in the processor, (b) using transaction hardware in the processor to determine whether the IP from LBR buffer points to a readable page in memory, and (c) determining that heavyweight code analysis is not warranted in response to a determination that the page pointed to by the IP from LBR buffer is not readable. Other embodiments are described and claimed.

25 Claims, 4 Drawing Sheets

(56) References Cited

U.S. PATENT DOCUMENTS

| | | | | |
|---|---|---|---|---|
| 2016/0034687 | A1* | 2/2016 | Rhee | G06F 21/60 |
| | | | | 726/23 |
| 2017/0091454 | A1* | 3/2017 | Sukhomlinov | G06F 21/566 |
| 2017/0116418 | A1 | 4/2017 | Shanmugavelayutham et al. | |
| 2017/0116419 | A1* | 4/2017 | Woodward | G06F 12/10 |
| 2018/0225446 | A1* | 8/2018 | Liu | G06F 21/577 |
| 2018/0285561 | A1* | 10/2018 | Frank | G06F 21/562 |
| 2018/0349603 | A1* | 12/2018 | Yamada | G06F 21/566 |
| 2019/0258806 | A1* | 8/2019 | Levin | G06F 21/44 |

OTHER PUBLICATIONS

Kleen, "Advanced usage of last branch records", Mar. 30, 2016, 5 pages, Eklektix, Inc., https://lwn.net/Articles/680996/.

Kleen, "An introduction to last branch records", Mar. 30, 2016, 6 pages, Eklektix, Inc., https://lwn.net/Articles/680985/.

Wikipedia, "Binary translation", 5 pages, accessed Feb. 19, 2018, https://en.wikipedia.org/wiki/Binary_translation.

Intel Corporation, "Intel® Transactional Synchronization Extensions (Intel® TSX) Programming Considerations", 5 pages, accessed Mar. 4, 2018, https://software.intel.com/en-us/node/524023.

Intel Corporation, "Intel® Transactional Synchronization Extensions (Intel® TSX) Overview" 2 pages, accessed Feb. 19, 2018, https://software.intel.com/en-us/node/524022.

Intel Corporation, "Last Branch Record Trace", 1 page, accessed Mar. 1, 2018, https://software.intel.com/en-us/node/676430.

Golyani, "How to get LBR contents on Intel x86", 26 pages, accessed Mar. 7, 2018.

Irelan, et al., "Performance Monitoring Unit Sharing Guide", 13 pages, Feb. 4, 2018.

Reinders, "Processor Tracing", 8 pages, Sep. 18, 2013, https://software.intel.com/en-us/blogs/2013/09/18/processor-tracing.

Wikipedia, "Return-oriented programming", 7 pages, accessed Feb. 14, 2018, https://en.wikipedia.org/wiki/Return-oriented_programming.

Intel Corporation, "Intel® 64 and IA-32 Architectures Software Developer's Manual vol. 1: Basic Architecture", 484 pages, Dec. 2017.

Wikipedia, "System Call", 6 pages, accessed Mar. 1, 2018, https://en.wikipedia.org/wiki/System_call.

U.S. Appl. No. 15/609,369, filed May 31, 2017, entitled "System, Apparatus and Method for Instruction Level Behavioral Analysis Without Binary Instrumentation", by Koichi Yamada, et al.

\* cited by examiner

SYSTEMS, METHODS, AND APPARATUS FOR DETECTING CONTROL FLOW ATTACKS

TECHNICAL FIELD

The present disclosure pertains in general to computer security and in particular to systems, methods, and apparatus for detecting control flow attacks.

BACKGROUND

An attacker may use malicious software (malware) to cause a data processing system to perform operations that are not desired or authorized by the rightful owner or operator of the data processing system. Some types of malware work by adding unauthorized instructions to a program. Other types of malware work by making unauthorized changes to the flow of control within a program while that program is executing, without actually changing the program code itself. An attack which makes unauthorized changes to a program's control flow may be referred to as a control flow attack. For instance, when a program is executing, malware may perform a control flow attack against that program by manipulating the program's call stack. The attack technique of hijacking the control flow of a program by manipulating the program's call stack may be referred to in general as return oriented programming (ROP).

Malware that uses ROP may be implemented as malicious data. When that malicious data is processed by a program in a data processing system, the malicious data hijacks the control flow of the program by manipulating the program's call stack. For instance, if a program does not perform adequate bounds checking before saving input data to memory, and if certain input data occupies more bytes than expected by the program, that input data may cause a buffer overrun. In particular, when the program stores that input data to the stack, some of the input data may extend past the data area of the stack and into a control flow area of the stack. In particular, some of the input data may overwrite a good return address with a malicious return address. Consequently, when the program executes the return, control may flow/return to that malicious address. Also, instructions at the malicious address may be referred to as a gadget. Although those instructions may not cause problems when used normally, those instructions may cause problems when used as a gadget (i.e., when used as a result of a malicious manipulation of the program's control flow).

Since control flow attacks may cause a program to perform unauthorized operations without injecting malicious code into the program, control flow attacks may be difficult to detect. The present disclosure pertains to technology for detecting control flow attacks.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

As indicated above, the present disclosure pertains to technology for detecting control flow attacks. For purposes of this disclosure, the term "control flow exploit" may be used to refer to an instance of a control flow attack, to a type of control flow attack, to malware which is designed to perform a control flow attack, and to a security weakness which can be used to perform a control flow attack.

Figure 1:
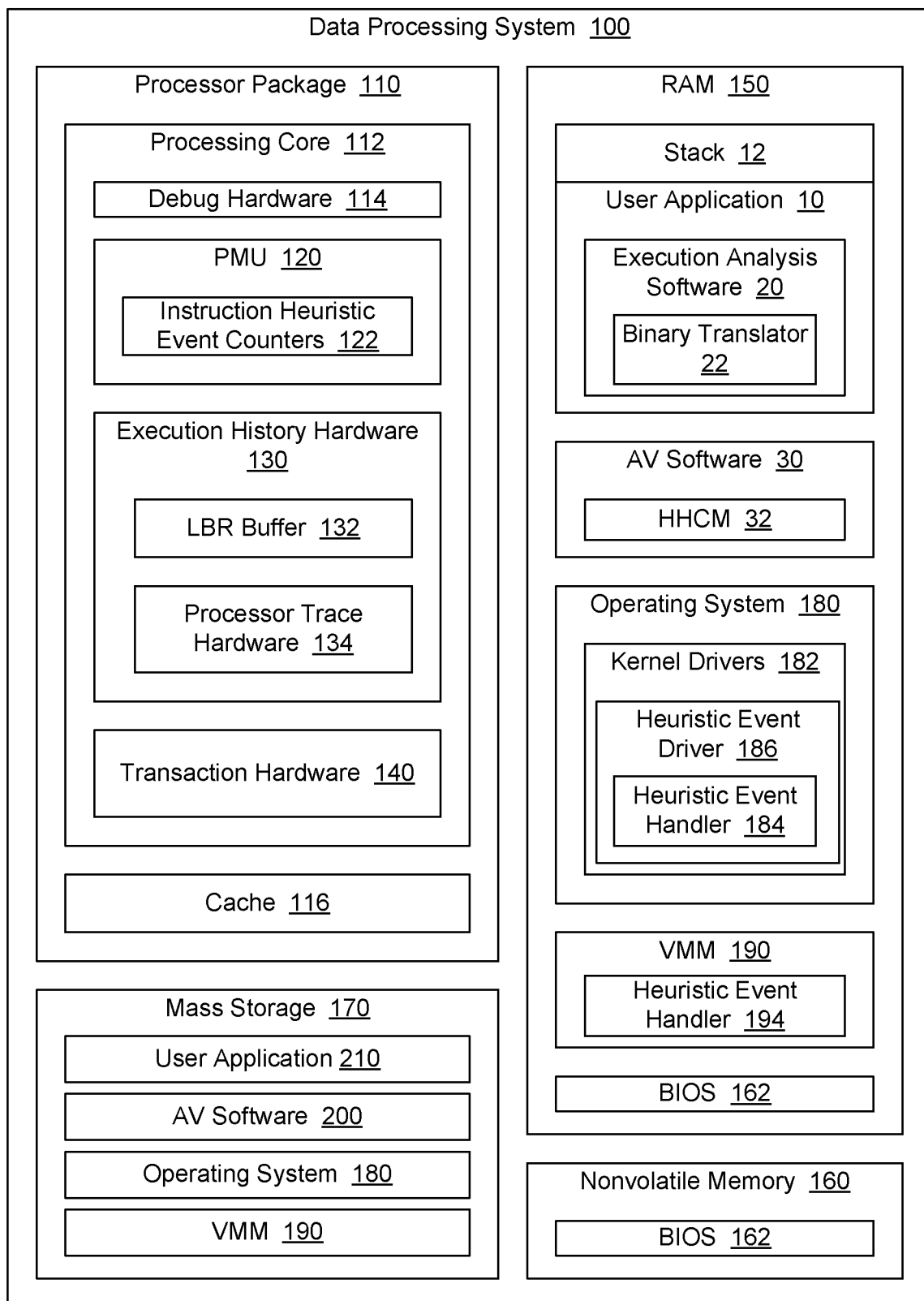
FIG. 1 is a block diagram of an example embodiment of a data processing system with technology for detecting control flow attacks.

FIG. 1 is a block diagram of an example embodiment of a data processing system 100 with technology for detecting control flow attacks. As described in greater detail below, data processing system 100 includes software components and hardware components which enable data processing system 100 to detect evasive malware attacks involving control flow exploits such as ROP. In particular, data processing system 100 includes hardware features which save or record information describing certain aspects of instruction execution, as well as software which analyzes that information to detect control flow attacks. The hardware features which record that information may be referred to as heuristic hardware. Accordingly, the process of using heuristic hardware to detect control flow attacks may be referred to as heuristic-hardware-driven execution analysis. The software components for detecting control flow attacks (include components which configure the heuristic hardware to facilitate attack detection) may be referred to collectively as attack detection software.

In one embodiment, data processing system 100 automatically identifies or recognizes anomalies in application execution by monitoring performance-monitoring counters such as the return-mispredict counter. In other words, data processing system automatically identifies anomalous execution events. Then, when an anomalous execution event has been detected, data processing system 100 may automatically trigger execution analysis software to detect malicious behavior such as an ROP exploit. For instance, the execution analysis software may use binary translation (BT) to detect malicious instruction-level behavior. In addition or alternatively, the execution analysis software may use debug hardware to detect malicious behavior. For purposes of this disclosure, execution analysis software may also be referred to as execution profiling software.

By triggering the execution analysis software only after an anomalous execution event has been detected, data processing system 100 reduces performance overhead and enhances efficiency. However, in some cases, the performance monitoring counters in a data processing system may record over one hundred thousand anomalous execution events per second. As described in greater detail below, to further enhance efficiency and reduce overhead, data processing system 100 uses one or more intermediate processes, after anomalous execution events have been detected, to filter out anomalous events that can safely be disregarded, instead of launching the execution analysis software for those events. The software for implementing such an intermediate process may be referred to as an event filter. Accordingly, data processing system 100 uses one or more event filters to determine whether an anomalous event is a suspicious event, and data processing system only invokes the execution analysis software for the suspicious events. Furthermore, as described in greater detail below, an event filter may use transaction hardware of a processor to efficiently determine whether anomalous events can be safely disregarded.

In the embodiment of FIG. 1, data processing system 100 includes a processor package 110 that contains at least one processing core 112 and cache memory 116 responsive to processing core 112. Cache memory 116 may be referred to simply as cache 116. Data processing system 100 also includes random access memory (RAM) 150, nonvolatile memory 160, and mass storage 170. RAM 150, nonvolatile memory 160, and mass storage 170 are communicatively coupled to processing core 112, possibly via one or more intermediate components, such as a memory controller, etc.

Mass storage 170 is a nonvolatile storage medium (e.g., a hard disk drive or a solid-state drive) which contains software to be executed by processing core 112. In particular, in the embodiment of FIG. 1, mass storage 170 includes an operating system (OS) 180, antivirus (AV) software 30, and a user application 10. Processing core 112 may copy the software components into RAM 150 for execution. Nonvolatile memory 160 may include a basic input/output system (BIOS) 162, and processing core 112 may also copy some or all of BIOS 162 into RAM 150 for execution.

OS 180 includes various drivers that execute with a high privilege level. For instance, the highest privilege level may be referred to as protection ring 0 or as kernel mode, and the OS drivers which use that privilege level may be referred to as ring 0 drivers or kernel drivers 182. In particular, OS 180 includes a heuristic event driver 186 that runs in ring 0, and that driver includes a heuristic event handler 184. For purposes of this disclosure, unless the context suggests a more precise intention, the term "heuristic event handler" may be also be used to refer to a heuristic event driver within which a heuristic event handler resides. As described in greater detail below, heuristic event handler 184 may facilitate the fast and safe detection of control flow attacks by performing lightweight code analysis in kernel mode, in response to performance monitor interrupts (PMIs). Accordingly, heuristic event handler 184 may be implemented as a PMI handler within heuristic event driver 186. The lightweight code analysis may include operations involving LBR instruction pointers (IPs).

In addition or alternatively, mass storage 170 may include a virtual machine monitor (VMM) 190, and VMM 190 may include a heuristic event handler 194. Heuristic event handler 194 may run in ring 0, and heuristic event handler 194 may perform the same or similar actions as heuristic event handler 184 in different embodiments or scenarios involving VMM-based attack detection, in addition to or in place of OS-based attack detection.

As illustrated, AV software 30 includes a heuristic hardware configuration manager (HHCM) 32. As described in greater detail below HHCM 32 may specify configuration settings to be loaded into the heuristic hardware of data processing system 100. For instance, as indicated below, in one embodiment, heuristic event driver 186 configures the heuristic hardware, based at least in part on HHCM 32.

As illustrated, user application 10 includes execution analysis software 20, and execution analysis software 20 includes a binary translator (BT) 22. Before user application 10 is executed on data processing system 100, AV software 30 may insert execution analysis software 20 into user application 10. Accordingly, execution analysis software 20 may also be referred to as embedded monitor software. In the embodiment of FIG. 1, user application 10 runs with less privilege than heuristic event handler 184. For instance, user application 10 may run in protection ring 3. That privilege level may also be referred to as user mode. Accordingly, user application 10 and execution analysis software 20 may run in user mode, and heuristic event handler 184 may run in kernel mode. Also, as illustrated, when user application 10 executes, it may create a call stack 12. User application 10 may use stack 12 to store return addresses, local data, etc. Moreover, as indicated above, a control flow exploit may use stack 12 to hijack user application 10. For instance, as indicated above, a control flow exploit may cause user application 10 to store data to stack 12 in a way that causes some of that data to extend past a data area of stack 12 and into a control flow area of stack 12.

As indicated above, heuristic event handler 184 may perform lightweight code analysis. By contrast, execution analysis software 20 may use BT 22 to perform heavyweight code analysis. For instance, as described in greater detail below, heuristic event handler 184 may be triggered by PMIs, and heuristic event handler 184 may use lightweight code analysis to filter out events that can be safely disregarded. And for events that heuristic event handler 184 determines to be suspicious, execution analysis software 20 may perform heavyweight code analysis to detect malware attacks.

In some embodiments, the AV software, the heuristic event handler, the execution analysis software, and related components may operate, in at least some respects, like the corresponding components in U.S. patent application pub. no. 2017/0116418 entitled "Hardware Heuristic-Driven Binary Translation-Based Execution Analysis For Return-Oriented Programming Malware Detection." In other embodiments, the AV software, the heuristic event handler, the execution analysis software, and related components may use other techniques to provide instruction-level execution analysis for malware detection and false positive determination.

As indicated above, the software components for detecting control flow attacks may be referred to collectively as attack detection software. In the embodiment of FIG. 1, the attack detection software includes without limitation AV software 30, heuristic event handler 184, and execution analysis software 20.

In the embodiment of FIG. 1, processing core 112 includes debug hardware 114, a performance monitoring unit (PMU) 120, execution history hardware 130, and transaction hardware 140. Execution history hardware 130 includes a last branch record (LBR) buffer 132 and processor trace (PT) hardware 134. For purposes of this disclosure, components like PMU 120 and execution history hardware 130 may be referred to in general as heuristic hardware.

Debug hardware 114 includes features such as debug registers which can set breakpoints and enable single stepping of a program for debugging purpose.

PMU 120 includes instruction heuristic event counters 122 (e.g., a return branch mispredict counter, a jump (JMP) mispredict counter, a return-call (RET-CALL) bias counter, and other types of heuristic counters) for the instructions recently executed by processing core 112. Instruction heuristic event counters 122 may be implemented as existing PMU counters and/or as special-purpose performance counters to detect execution anomalies.

Heuristic event driver 186 may use hardware-based masking features to specify the types of counters to be used and to specify the conditions to be monitored. In one embodiment, heuristic event driver 186 manages and configures the heuristic hardware (e.g., the counters in PMU 120, the hardware for recording branch history, etc.) based on the data in HHCM 32. Accordingly, the data in HHCM 32 may be referred to as malware attack detection settings. Accordingly, heuristic event driver 186 may specify the information to be saved and the conditions that will trigger PMIs, based on HHCM 32. For instance, HHCM 32 may include data to define a user/OS-mode mask, and heuristic event driver 186 may load that mask into the hardware-based masking features. Consequently, that mask may cause instruction heuristic event counters 122 to track events and attributes associated with changes from user mode to kernel mode and vice versa. HHCM 32 may include additional settings for the heuristic hardware (e.g., threshold values to define the conditions which will cause PMU 120 to generate PMIs due to execution anomalies), and heuristic event driver 186 may load those settings from HHCM 32 into the heuristic hardware. Consequently, execution history hardware 130 may record an accurate and detailed branch history for the instructions recently executed by processing core 112. However, in other embodiments, some or all of the malware attack detection settings may be stored differently, and the software components (e.g., the AV software and the heuristic event driver) may divide the work differently.

The hardware-based masking features in execution history hardware 130 may include LBR filter features and PT filter features. The LBR filter features may include an LBR-select feature, which may be implemented using a model-specific register (MSR), such as MSR-LBR_SELECT. At least some of the PT filter features may be the same as or similar to the LBR filter features. To configure execution history hardware 130, HHCM 32 load predetermined masks into the LBR and PT filter features. For instance, those masks may cause LBR buffer 132 and/or processor trace hardware 134 to record execution history information for the specific branches or the specific types of branches that are recorded in instruction heuristic event counters 122.

Processing core 112 uses LBR buffer 132 to automatically save information about the last N branches taken by processing core 112. The information for each branch may be referred to as a record or an entry. For instance, an entry for a branch in LBR buffer 132 may include fields such as a branch mispredict bit, a from-LBR-address field to identify the from-address for that branch, and a to-LBR-address field to identify the to-address (i.e., the target) for that branch. For purposes of this disclosure, the data in the from-LBR-address field and the data in the to-LBR-address field may be referred to in general as LBR IPs and collectively as an LBR IP pair.

Processing core 112 uses processor trace hardware 134 to automatically save data packets containing information that traces or describes the control flow followed by processing core 112. For instance, PT packets may include timing and program flow information, such as branch targets and branch taken/not taken indications. PT packets may also include information about program-induced execution modes, including information about state transitions associated with hardware transactions and information about changes to control registers (CRs) associated with virtual addressing, such as CR3.

Transaction hardware 140 provides hardware support for grouping one or more operations into a single transaction, and for automatically backing out those operations if all of the operations are not able to successfully complete. In some embodiments, transaction hardware 140 may be implemented using the technology described by Intel Corporation under the name or trademark "INTEL® Transaction Synchronization Extensions" or "INTEL® TSX." Additional details on INTEL® TSX may be found in Volume 1 of the "INTEL® 64 and IA-32 Architectures Software Developer's Manual" dated December 2017. For instance, Chapter 16 of that manual (entitled "Programming With Intel® Transactional Synchronization Extensions") describes transaction hardware features. Also, information about C and C++ intrinsics that support INTEL® TSX instructions may be found in on the Internet at software.intel.com/en-us/node/524023, in the web page entitled "INTEL® Transactional Synchronization Extensions (INTEL® TSX) Programming Considerations." In other embodiments, however, other techniques may be used to implement transaction hardware.

In general, a method for detecting control flow attacks may be based on process or thread execution, and it may use lightweight code inspection. Also, the detection method may be based on past branch execution history, and it may use debug hardware features and trace hardware features such as an LBR buffer. However, such a detection method may face numerous challenges.

For one thing, the LBR buffer may be a system-wide buffer, in that it records information for all branches taken by all processes running on the processing core, not just the branches taken by a particular process. Consequently, it may be difficult to determine which LBR buffer entries pertain to which processes, and therefore whether the LBR IPs in a particular entry belong to particular process of interest, such as the current process. Furthermore, if the current process were to attempt to access an LBR IP that does not belong to the current process, that attempt may result in a memory access exception.

The risk of memory access exceptions makes it difficult and/or risky for a kernel driver component that is triggered by a PMI to directly perform code inspection for user space memory. For instance, if the interrupt service routine (ISR) of the kernel driver were to cause a page fault by directly accessing pageable application memory space, that page fault may cause an irrecoverable OS error, such as a so-called "blue screen of death."

A kernel driver may avoid such page faults by simply not trying to access the pageable application memory space, and instead leaving it to the embedded monitor software to perform the code inspection, after the kernel driver has transferred control to the embedded monitor software. Thus, code inspection would be done by the embedded monitor software. However, transferring control from the kernel driver to the embedded monitor software requires a context switch, which entails significant overhead, because switching context involves (a) saving the state of the first process (including data in registers such as the program counter, etc.), so that the saved state can be restored to resume execution of the first process later, and then (b) loading state for the second process. If a context switch from the kernel driver to the embedded monitor software were required for every anomalous event, the processing core would experience significant processing overhead and complexity to conduct code inspection for control flow attacks.

Moreover, to handle memory exceptions while inspecting the application memory from the embedded monitor software may require hooking into the exception handler code of the application and implementing recovery code. It may be impractical or very difficult and expensive to satisfy those requirements.

In addition, it may be desirable to implement all of the attack detection software (e.g., the logic that does lightweight code analysis and the logic that does heavyweight code analysis) outside of the monitored process (e.g., as a ring 0 driver and/or a VMM component), to provide for complete isolation of the attack detection software, for enhanced security. For instance, it may be desirable use independent monitor software to perform the heavyweight code analysis, rather than embedded monitor software. In such an embodiment, there may not be any embedded monitor software to which exception handling hooks could be added.

As indicated above, a context switch is required to transfer control from a kernel mode process to a user-mode process. A context switch is also required to transfer control from a user-mode process to a kernel-mode process. A context switch is also required to transfer control from one user mode process to another user mode process. In addition, when transferring control from one user mode process to another user mode process, it is necessary to perform an address space switch. For purposes of this disclosure, a context switch that also includes an address space switch may be referred to as a process switch.

As indicated above, the present disclosure describes software for quickly and efficiently performing lightweight code analysis, to reduce or minimize the amount of heavyweight code analysis that might otherwise be needed to detect control flow attacks. In particular, heuristic event handler 184 uses transaction hardware 140 of processing core 112 to facilitate lightweight code analysis. Specifically, as described in greater detail below, heuristic event handler 184 executes in kernel mode, and heuristic event handler 184 uses transaction hardware 140 to filter out entries anomalous events that do not need to be processed with heavyweight code analysis. The filtering techniques used by heuristic event handler 184 may also include dynamic whitelisting of memory addresses and other operations to enhance efficiency. Thus, heuristic event handler 184 may use advanced filtering techniques to minimize or reduce the number of times that heavyweight, user-mode, execution analysis software is invoked or executed.

Figure 2:
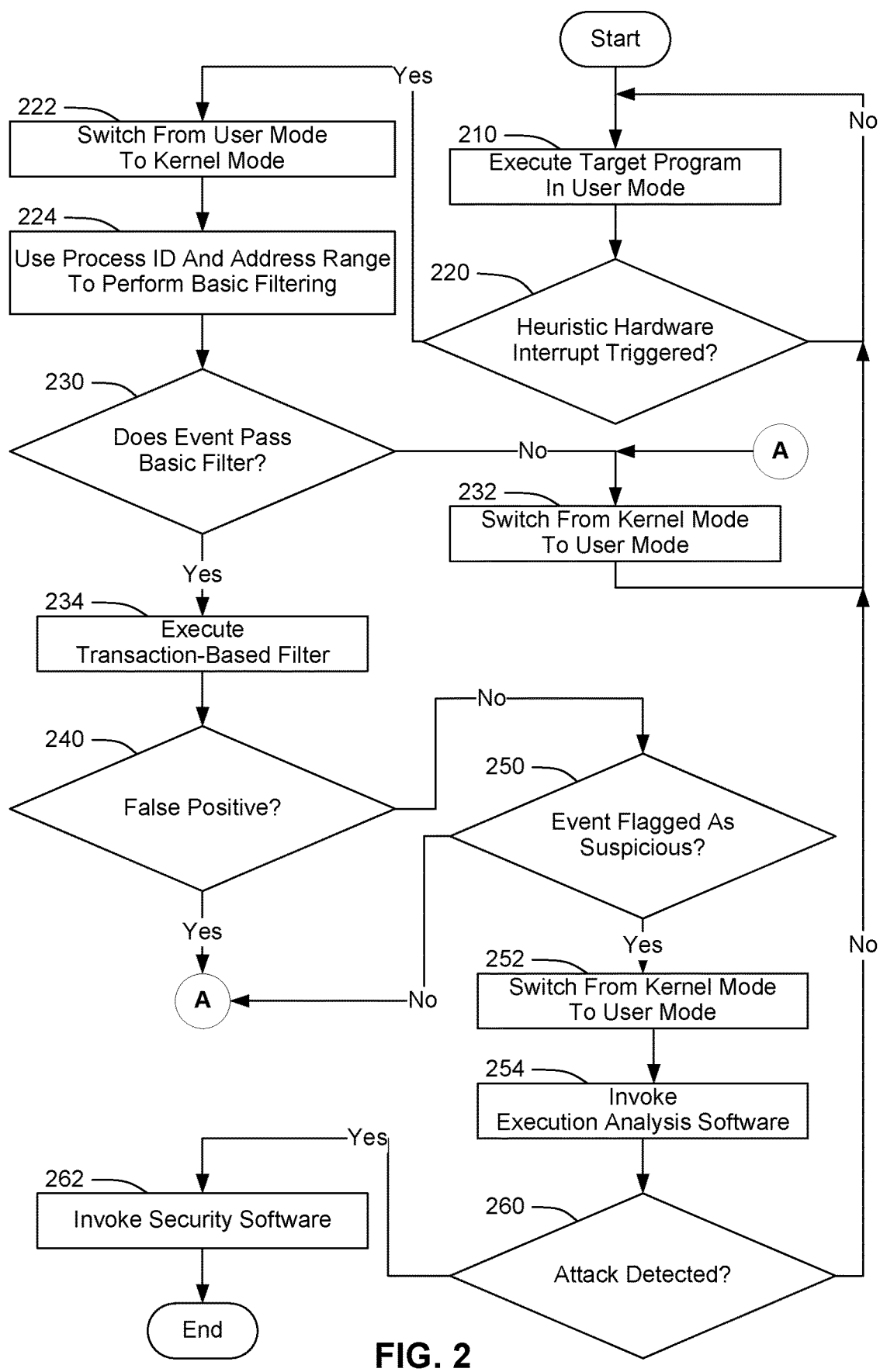
FIG. 2 presents a flowchart of an example embodiment of a process for detecting control flow attacks.

FIG. 2 presents a flowchart of an example embodiment of a process for detecting control flow attacks. The process of FIG. 2 may be referred to as a hardware-assisted execution analysis process for exploit detection. FIG. 2 depicts that process from a high level, and subsequent figures provide further details on certain aspects of the process, including processes for filtering PMI interrupts using the LBR hardware and transaction hardware 140.

The process of FIG. 2 starts with a target program executing on processing core 12 in user mode, as shown at block 210. The target program may be user application 10 from FIG. 1, for example. In addition, as indicated above, before user application 10 begins executing, AV software 30 has already added execution analysis software 20 to user application 10. Also, in the embodiment of FIG. 2, AV software 30 has already used HHCM 32 to load configuration settings into the heuristic hardware of data processing system 100.

As shown at block 220, if the heuristic hardware in processing core 112 does not trigger an interrupt, the target program may continue executing in user mode. However, when an anomalous event causes the heuristic hardware to trigger an interrupt (e.g., a PMI), OS 180 may respond by automatically switching context from the target program in user mode to heuristic event handler 184 in kernel mode, as shown at block 222. For instance, PMU 120 may generate a PMI in response to a branch mispredict counter in instruction heuristic event counters 122 exceeding a threshold for mispredicts that was set by HHCM 32, since a control flow exploit may start by hijacking branch targets, resulting in a series of branch mispredicts.

As shown at block 224, heuristic event handler 184 may then perform basic filtering, based on process and thread information for the target program. Such process and thread information may include the process identifier (ID) for the target program and the address range for the target program. For instance, PMU 120 may identify the process that caused the PMI, and heuristic event handler 184 may compare that process ID (PID) with the PID for the target program. Heuristic event handler 184 may then filter out the PMI if it was not caused by the target program. Or, if there are multiple target programs, heuristic event handler 184 may filter out the PMI if it was not caused by any of the target programs. Heuristic event handler 184 may then apply the address range filtering to filter out the PMI if it was generated within a whitelisted address range.

As shown at block 230, heuristic event handler 184 may then determine whether the anomalous event passes the basic filter and therefore requires further analysis. If the basic filter filtered out the event (e.g., based on a determination that the PMI was not caused by the target program), OS 180 may switch processing core 112 from kernel mode to user mode, as shown at block 232, and then whichever process got interrupted by the PMI may resume executing in user mode, as shown at block 210.

However, if the basic filter indicates that the anomalous event should be analyzed some more, heuristic event handler 184 use a transaction-based filter to further analyze the event, as shown at block 234. The transaction-based filter may then use transaction hardware 140 to further analyze the event, as described in greater detail below with regard to FIG. 3. For instance, heuristic event handler 184 may determine whether the anomalous event is a false positive or a suspicious event.

As shown at block 240 of FIG. 2, if heuristic event handler 184 has flagged the event as a false positive, OS 180 may switch processing core 112 from kernel mode to user mode, as shown at block 232, and then whichever process was interrupted by the PMI may resume executing in user mode, as shown at block 210. However, if the event was not a false positive, heuristic event handler 184 may determine whether the transaction-based filter flagged the event as suspicious, as shown at block 250. If the event was not flagged as suspicious, OS 180 may switch processing core 112 from kernel mode to user mode, as shown at block 232, and then whichever process was interrupted by the PMI may resume executing in user mode, as shown at block 210.

However, if the event was flagged as suspicious, OS 180 may switch processing core 112 from kernel mode to user mode, as shown at block 252, and OS 180 may invoke execution analysis software 20, as shown at block 254. Execution analysis software 20 may then perform heavyweight analysis of the target program's execution history to determine whether the event reflects a control flow attack. For instance, execution analysis software 20 may use BT 22 to analyze recently executed instruction. In particular, in one embodiment, execution analysis software 20 performs instruction-level execution analysis to check or verify execution attributes that include without limitation (a) control flow integrity (CFI); (b) program state integrity (e.g., stack boundary integrity, stack frame sanity, heap consistency, etc.); (c) calling and register convention validity; and (d) instruction usage validation, to determine whether the anomalous event is either due to a malware attack or a false positive. Moreover, execution analysis software 20 may also use transaction hardware 140 when performing its analysis. In addition or alternatively, execution analysis software 20 may use techniques like those described in connection with the BT software of U.S. patent application pub. no. 2017/0116418 (referenced above) to detect control flow attacks. For instance, execution analysis software 20 may obtain information about recently executed instructions from processor trace hardware 134.

As shown at blocks 260 and 262, if execution analysis software 20 detects a control flow attack, execution analysis software 20 may then automatically invoke security software such as AV software 30 to combat or ameliorate the attack. AV software 30 may then automatically terminating the application, for instance.

However, if execution analysis software 20 determines that the anomalous event does not reflect a control flow attack, execution analysis software 20 may then return control to the code within the target program that was executing when the PMI was triggered, as shown at block 210.

In addition, execution analysis software 20 may be configured with a threshold value to limit the amount of monitoring within any particular predetermine cycle or period. When heuristic event handler 184 reaches the defined threshold (e.g., two hundred basic-block executions) for the current execution monitoring period, heuristic event handler 184 may stop the execution monitoring and switch to native execution of user application 10.

Figure 3:
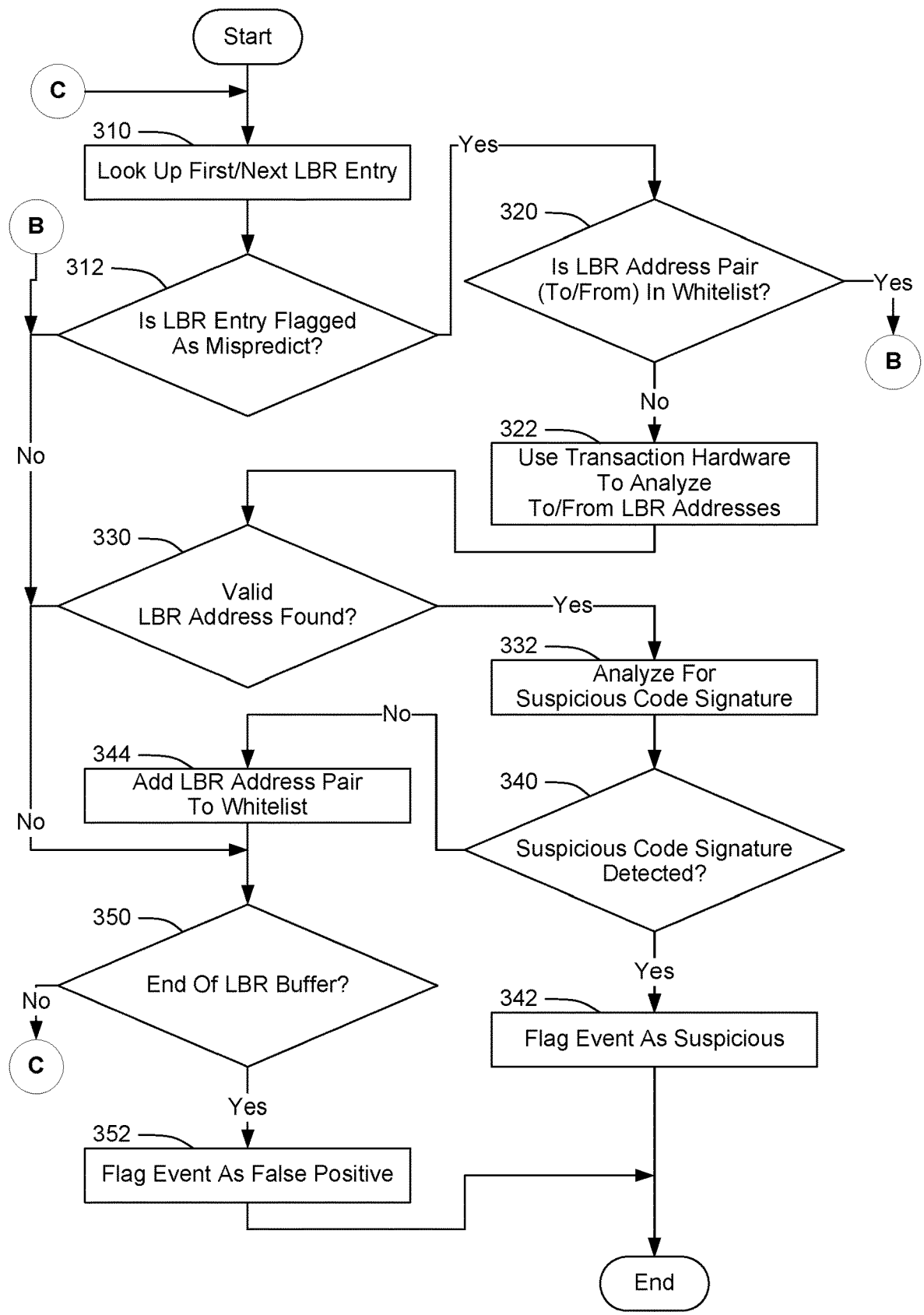
FIG. 3 presents a flowchart of an example embodiment of a process for using a transaction-based filter to detect control flow attacks.

FIG. 3 presents a flowchart of an example embodiment of a process for using a transaction-based filter to detect control flow attacks. In particular, FIG. 3 depicts operations for implementing block 234 of FIG. 2. As indicated above, block 234 is performed if the basic filter indicates that the anomalous event should be analyzed some more, and block 234 represents heuristic event handler 184 using a transaction-based filter to further analyze the event. That transaction-based filter may be implemented as part of heuristic event handler 184, for instance.

The transaction-based filter is designed to filter out most PMIs through basic inspection of data in LBR buffer 132, through further inspection of the LBR IP addresses in some situations, and with the utilization of transaction hardware 140 in some situations. This LBR-based filtering technique may start the code inspection from the youngest branch to the oldest branch by walking the entries in LBR buffer 132. Thus, as shown at block 310, the process of FIG. 3 may start by looking up the first entry in LBR buffer 132.

To accelerate the inspection, the transaction-based filter may use the branch mispredict bit in the LBR entry to quickly identify suspicious branch instructions for code inspection, since exploitation typically starts with hijacking branch targets and results in a series of branch mispredicts. Accordingly, as shown at block 312, the transaction-based filter may check the branch mispredict bit in the current entry to determine whether the branch for that entry was mispredicted. If the entry is not flagged as a mispredict, the transaction-based filter may move on to the next entry without performing any further analysis for the current entry. For instance, as shown at block 350, the transaction-based filter may determine whether there are any remaining unprocessed entries in LBR buffer 132. If the transaction-based filter has reached the end of LBR buffer 132, the transaction-based filter may flag the anomalous event as a false positive, as shown at blocks 352, and the process of FIG. 3 may end. And if the transaction-based filter has not reached the end of LBR buffer 132, processing may return to block 310, with the transaction-based filter looking up the next entry in LBR buffer 132 and processing that entry as indicated above and below.

Referring again to block 312, if the entry is flagged as a mispredict, the transaction-based filter may then determine whether the LBR IP pair is in a whitelist of known safe IP pairs that is maintained by the transaction-based filter, as indicated below with regard to block 344. If the LBR IP pair is in that IP whitelist, the transaction-based filter may move on to the next entry without performing any further analysis for the current entry.

If the LBR IP pair is not in the IP whitelist, the transaction-based filter may use transaction hardware 140 to analyze the LBR IPs further, as shown at block 322. As indicated below, transaction hardware 140 enables the transaction-based filter to obtain important information about the LBR IPs (e.g., to inspect the memory locations recorded in the LBR IPs) while executing in kernel mode and without any risk of causing memory exceptions or page faults. Consequently, transaction hardware 140 enables safe and exception-free lightweight code inspection, such as decoding of instructions and checking on validity of control flow transfers. The information that the transaction-based filter obtains enables the transaction-based filter to determine whether either of the LBR IP addresses is valid. Additional details on such analysis are provided below with regard to FIG. 4.

As shown at block 330 of FIG. 3, if the transaction-based filter did not find a valid LBR IP address in the current LBR entry, the transaction-based filter may move on to the next entry without performing any further analysis for the current entry. However, if the transaction-based filter found at least one valid LBR IP address, the transaction-based filter may then analyze stack 12 to determine whether stack 12 includes a suspicious code signature or other suspicious code characteristics, as shown at block 332. For instance, the transaction-based filter may determine (a) whether the current entry is for a return (RET) branch, (b) whether the target of the current entry (i.e., the to-LBR-address) does not have a preceding CALL instruction, and (c) whether the target of the current entry is a potential or suspected gadget. For instance, a suspicious code signature may be a predetermined pattern associated with a known or suspected ROP gadget, and the transaction-based filter may conclude that stack 12 includes a suspicious code signature in response to detecting such a pattern in stack 12. For example, a suspicious code signature may include a pattern that includes a return branch target but no preceding call instruction. Another suspicious code signature may include stack memory containing critical application programming interface (API) addresses that are commonly injected and used by one or more ROP gadgets. In addition, the transaction-based filter may take into account the analysis results of the previous LBR entry pairs when determining whether stack 12 contains any suspicious code signatures. For instance, the transaction-based filter may consider the number of LBR buffer entries that have target addresses without preceding CALL instructions, in connection with a corresponding predetermined threshold. Moreover, to avoid exceptions, the transaction-based filter may use transaction hardware 140 when checking stack 12.

As shown at blocks 340 and 342, if stack 12 includes suspicious code characteristics, the transaction-based filter may flag the anomalous event as suspicious, the process of FIG. 3 may end, and heuristic event handler 184 may process the suspicious event as indicated above with regard to FIG. 2.

However, if suspicious code characteristics are not detected, the transaction-based filter may add the LBR IP pair to the IP whitelist, as shown at block 344. In other words, once the source/destination address pair is found to be legitimate after inspection, the transaction-based filter may add this address pair to the IP whitelist. Also, the transaction-based filter may maintain a separate IP whitelist for each monitored process. As indicated above with regard to block 320, the transaction-based filter may use the IP whitelist to avoid repeated code inspection on the same address locations. In one embodiment, the transaction-based filter creates the IP whitelist as a hash table, to facilitate fast lookups.

As shown at block 350, the transaction-based filter may then determine whether all of the entries in LBR buffer 132 have been processed. If the transaction-based filter has not yet reached the end of LBR buffer 132, the process of FIG. 3 may return to block 310, and the transaction-based filter may process any remaining entries as indicated above. However, if the transaction-based filter has processed all of the entries without finding any suspicious code characteristics, the transaction-based filter may flag the anomalous event as a false positive, as shown at block 352, and the process of FIG. 3 may end.

For purposes of this disclosure, an anomalous event may be referred to as having passed the transaction-based filter if the transaction-based filter does not flag the event as a false positive but instead flags the event as suspicious. As indicated above with regard to blocks 240, 250, 252, and 254 of FIG. 2, if an event passes the transaction-based filter, heuristic event handler 184 may then switch context to user mode and invoke execution analysis software 20 for further processing to determine whether a control flow attack has occurred.

Figure 4:
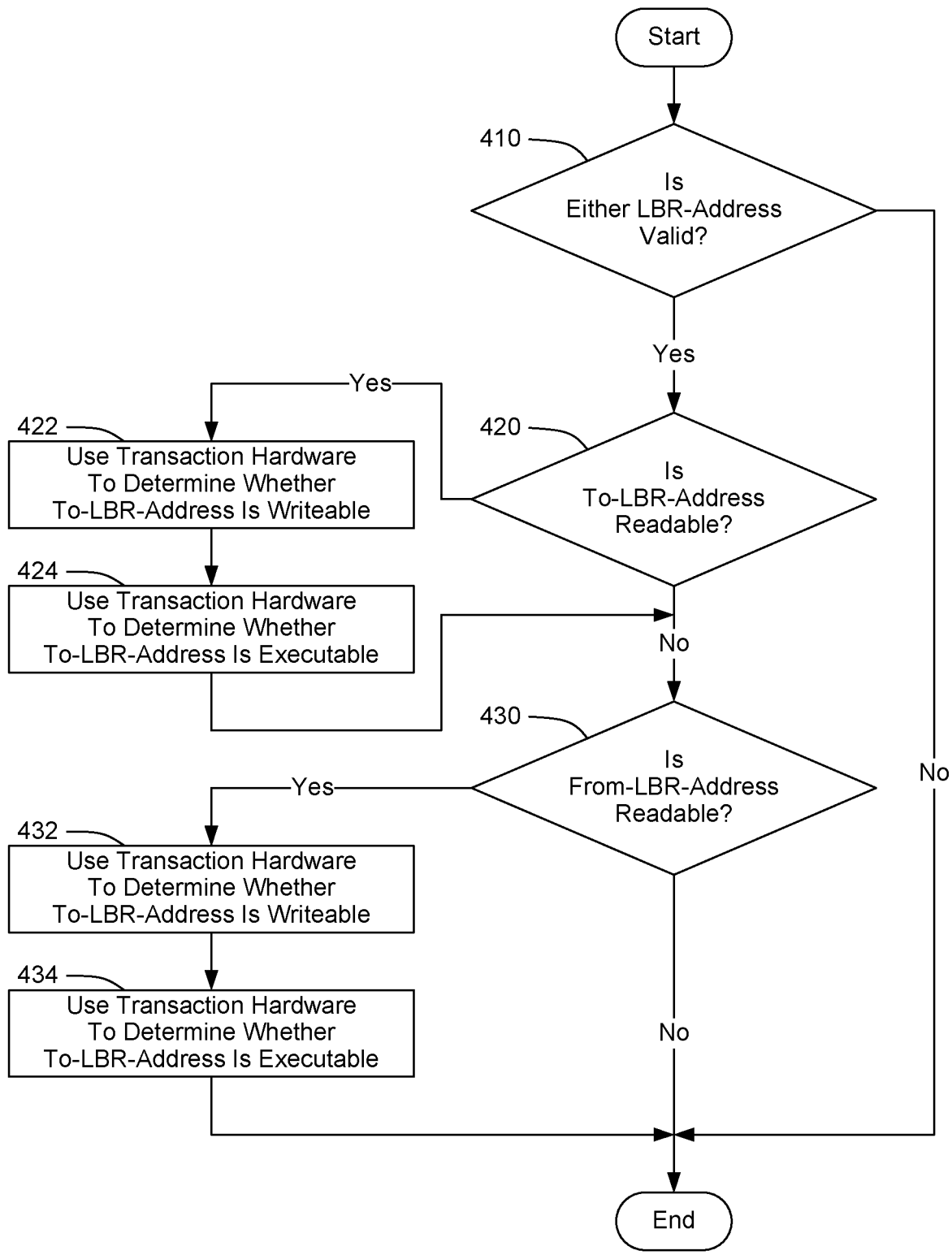
FIG. 4 presents a flowchart of an example embodiment of a process for using transaction hardware to analyze memory addresses.

FIG. 4 presents a flowchart of an example embodiment of a process for using transaction hardware 140 to analyze memory addresses. In particular, as indicated above, FIG. 4 depicts operations for implementing block 322 of FIG. 3. As shown at block 410, those operations may start with the transaction-based filter using transaction hardware 140 to determine whether either LBR IP address is valid. For instance, the transaction-based filter may use transaction hardware 140 to determine whether either IP address is readable without the risk of causing a memory exception or a page fault, and the transaction-based filter may conclude that an LBR IP address is valid if that address is readable. The pseudocode below provides additional details for one example embodiment of software for determining whether either LBR IP address is valid. If neither LBR IP address is valid, the process of FIG. 4 may end.

However, if either LBR IP address is valid, the transaction-based filter may then determine whether the to-LBR-address is readable and whether the from-LBR-address is readable, as shown at blocks 420 and 430. As shown at block 422, if the to-LBR-address is readable, the transaction-based filter may use transaction hardware 140 to determine whether the to-LBR-address is writable. And as shown at block 424, the transaction-based filter may use transaction hardware 140 to determine whether the to-LBR-address is executable. Similarly, if the from-LBR-address is readable, the transaction-based filter may use transaction hardware 140 to determine whether the from-LBR-address is writable, as shown at block 432. And as shown at block 434, the transaction-based filter may use transaction hardware 140 to determine whether the from-LBR-address is executable. The process of FIG. 4 may then end, and control may flow to block 330 of FIG. 3, and the transaction-based filter may proceed according to the results of the operations of FIG. 4, as indicated above.

The pseudocode below provides additional details for an example embodiment of software for determining whether either LBR IP address is valid, along with additional details for example embodiments of software for determining whether an LBR address is readable, whether an LBR address is writeable, and whether an LBR address is executable. The pseudocode below may be used to implement the transaction-based analysis presented in FIG. 4. The pseudocode includes a main function or routine (named "Transaction-Based-Analysis") which calls various other functions (LBR-Address-Valid, Is-Address-Writeable, and Is-Address-Executable). Additionally, the LBR-Address-Valid function calls another function, named "Is-Address-Readable."

In one embodiment, the following Transaction-Based-Analysis function corresponds to block 322 of FIG. 3.

```
int Transaction-Based-Analysis ( )
{
// The main objectives of this function are as follows:
// 1. Determine whether LBR addresses are readable.
// 2. If an LBR address is readable:
//     2.1. Determine whether that LBR address is writeable.
//     2.2. Determine whether that LBR address is executable.
//     2.3. Obtain the contents of the that LBR address.
// Global Variables:
       int Index;            // Identifies the current entry in the LBR Buffer.
       int To-Readable;      // Boolean: Was the To-LBR-Address readable?
       int To-Writeable;     // Boolean: Was the To-LBR-Address writeable?
       int To-Executable;    // Boolean: Was the To-LBR-Address executable?
       int To-Content;       // The data from the To-LBR-Address.
       int From-Readable;    // Boolean: Was the From-LBR-Address readable?
       int From-Writeable;   // Boolean: Was the From LBR-Address writeable?
       int From-Executable;      // Boolean: Was the From-LBR-Address executable?
       int From-Content;     // The data from the From-LBR-Address.
// Local Variables:
       int Valid;            // Boolean: Was at least one LBR-Address readable?
// Operations:
       Valid = LBR-Address-Valid ( )
       if Valid{
           if To-Readable {
               Target-Address = To-LBR-Address(Index);
               Is-Address-Writeable (Target-Address, To-Content);
               Is-Address-Executable (Target-Address);
           }
```

-continued

```
        if From-Readable {
            Target-Address = From-LBR-Address(Index);
            Is-Address-Writeable (Target-Address, From-Content);
            Is-Address-Executable (Target-Address);
        }
    }
    return Valid;
}
```

In one embodiment, the following LBR-Address-Valid function corresponds to block 410 of FIG. 4.

```
int LBR-Address-Valid ( )
{
// Function to determine whether LBR addresses are readable and, if so, to return
// the contents of those addresses.
// Global Variables:
    int Index;          // Identifies the current entry in the LBR Buffer.
    int To-Readable;    // Boolean: Was the To-LBR-Address readable?
    int To-Content;     // The data (e.g., an instruction) from the To-LBR-Address.
    int From-Readable;  // Boolean: Was the From-LBR-Address readable?
    int From-Content;   // The data (e.g., an instruction) from the From-LBR-Address.
// Local Variables:
    int Target-Address; // Gets loaded with the To-LBR-Address or the
                        // From-LBR-Address.
// Operations:
    Target-Address = To-LBR-Address(Index);
    To-Readable = Is-Address-Readable(Target-Address, To-Content);
    Target-Address = From-LBR-Address(Index);
    From-Readable = Is-Address-Readable(Target-Address, From-Content);
    if (From-Readable or To-Readable)
        return true;
    else
        return false;
}
```

The following Is-Address-Readable function is called by the above LBR-Address-Valid function.

```
int Is-Address-Readable (int Target-Address, int Content)
{
// Function to determine whether a given addresses is readable and, if so,
//   to return the content of that address.
// Target-Address is the address that this function tries to read.
// Content gets loaded with the data from the Target-Address.
// Local Variables:
    int Readable-Flag;  // Boolean flag: Was the Target-Address
                        // readable?
    int Max-Tries;      // Maximum number of time to try reading
                        // the Target-Address.
    int i;              // Loop counter.
// Operations:
    Readable-Flag = false;
    Max-Tries = 5;
    i = 1;
    loop:
        begin_transaction
            read from *Target-Address into Content;
        end_transaction;
        if transaction did not abort {
            Readable-Flag = true;
            escape_loop;
        }
        else
            i = i + 1;
        if i > Max-Tries
            escape_loop;
    end_loop;
    return Readable-Flag;
}
```

In one embodiment, the following Is-Address-Writeable function corresponds to blocks 422 and 432 of FIG. 4.

```
int Is-Address-Writeable (int Target-Address)
{
// Function to determine whether a given addresses is writeable.
// Target-Address is the address that this function tries to read.
// Local Variables:
    int Content;         // To hold data read from the Target-Address.
    int Writeable-Flag;  // Boolean flag: Was the Target-Address
                         // writeable?
    int Max-Tries;       // Maximum number of time to try writing to
                         // the Target-Address.
    int i;               // Loop counter.
// Operations:
    Writeable-Flag = false;
    Max-Tries = 5;
    i = 1;
    loop:
        begin_transaction
            read from *Target-Address into Content;
            write Content to *Target-Address;
        end_transaction;
        if transaction did not abort {
            Writeable-Flag = true;
            escape_loop;
        }
        else
            i = i + 1;
        if i > Max-Tries
            escape_loop;
    end_loop;
    return Writeable-Flag;
}
```

In one embodiment, the following Is-Address-Executable function corresponds to blocks 424 and 434 of FIG. 4.

```
int Is-Address-Executable (int Target-Address)
{
// Function to determine whether a given address is in an executable page or memory.
// Target-Address is an input parameter identifying an IP address from the LBR buffer.
// Local Variables:
    int Search-Address;         // To hold the Target-Address and associated addresses.
    int Executable-Flag;        // Boolean flag: Is the page executable?
    int Max-Tries;              // Maximum number of times to try executing a
                                // Search-Address with a RET opcode.
    int i;                      // Loop counter.
    int Address-Page-Limit;     // To mark the end of the memory page containing
                                // the Target-Address.
    int Return-Target;          // To hold the address of the page_executable label.
    int Temp-Stack-Pointer;     // To hold the current program stack pointer.
    int Mask-Complement;        // To hold the complement of the PAGE_SIZE_MASK.
// Operations:
    Executable-Flag = false;
    Max-Tries = 5;
    i = 1;
    Search-Address = Target-Address;
// Make the Search-Address page-size (e.g. 0x1000, 4KB) aligned,
// using a suitable page-size mask (e.g., 0x0FFF), by
// forming the complement of PAGE_SIZE_MASK (e.g., 0xF000)
// and then bit-wise adding the Mask-Complement to the Search-Address.
    Mask-Complement = ~ PAGE_SIZE_MASK;
    Search-Address = Search-Address & Mask-Complement;
    Address-Page-Limit = Search-Address + PAGE_SIZE_MASK;
// Loop to search for the RET instruction opcode in this page,
// starting at the first address in this page (since Search-Address was aligned).
    loop:
        if Search-Address contains a RET instruction
            escape_loop; // Exit loop if a RET instruction is found.
        Search-Address = Search-Address + 1;
        if Search-Address > Address-Page-Limit
// Since no RET instruction was found in the page, the Target-Address is very likely
// not executable.
            return Executable-Flag;        // Return as false;
    end_loop;
// If control reaches this point, a RET instruction was found at Search-Address.
// Save the address of the page_executable label in Return-Target.
    Return-Target = page_executable;
// Save the current program_stack_pointer.
    Temp-Stack-Pointer = program_stack_pointer;
    loop:
        begin_transaction {
// Change the program_stack_pointer to Return-Target, which is the address
// of the page_executable label below.
            program_stack_pointer = Return-Target;
// Jump to Search-Address, which contains a RET instruction.
// Consequently, when that RET is executed, control should pass to the address
// stored in the stack at the current program stack pointer (i.e., to the page_executable label).
            jump to Search-Address;
        }
        end_transaction;
        // If control reaches this point, the above transaction must have aborted,
        // since control did not jump to page_executable label
        i = i + 1;
        if i > Max-Tries
            escape_loop;
    end_loop;
// If control reaches this point, i > Max-Tries, and control never jumped to
// the page-executable label.
    return Executable-Flag; // Return as false.
// If the RET at Search-Address succeeds, control should reach this page_executable label.
page_executable:
// Make sure that the transaction gets ended.
    end_ transaction;
// Restore the program stack pointer;
    program_stack_pointer = Temp-Stack-Pointer;
    Executable-Flag = true;
    return Executable-Flag;
}
```

The branch addresses recorded in LBR buffer 132 are not guaranteed to be valid for the current user-mode process. For example, a recorded address may belong to a different process. Consequently, if a process were to try to read memory at the recorded address (e.g., to identify what type of instruction is at that address) without using transaction hardware 140, that read operation might cause a memory exception. However, handling exceptions is very expensive and may require hooking application code. According to the present disclosure, however, the transaction-based filter uses transaction hardware 140 to perform memory read operations without performing context switches, thus reducing or minimizing the context switch overhead. Transaction hardware 140 enables the transaction-based filter to use optimistic execution to safely read from memory, write to memory, and execute from memory. In case of a memory violation, instead of causing a page fault, processing core 112 will abort and automatically roll back the transaction. Consequently, the transaction-based filter may perform code inspection of the LBR IP addresses without costly checks of page properties and exception handling. Thus, the transaction-based filter uses transaction hardware 140 to access memory without causing or taking any memory exception or page faults. Also, since a hardware transaction may fail for reasons other than a page fault, the transaction-based filter may try a transaction multiple times before concluding that the page is invalid According to the above pseudocode, the Is-Address-Readable function optimistically reads a target address within a transaction, and in situations that could cause a page fault or memory exception outside of a transaction, transaction hardware 140 prevents such faults or exceptions. Instead, transaction hardware 140 aborts the transaction. Consequently, the transaction-based filter does not need to check whether the page exist or whether the page permissions are set to allow the page to be read. If the page read fails, the transaction gets aborted instead of generating an exception. Consequently, the transaction-based filter can avoid costly system calls to identify whether the page exists and can be read, and the transaction-based filter does not need to include an interrupt service routine to handle memory exceptions.

Similarly, the Is-Address-Writeable function and the Is-Address-Executable function use transaction hardware 140 to use memory addresses without causing memory exception or page faults and without operating system support. For instance, the Is-Address-Writeable function may determine whether an IP is in a writable page without any OS dependencies. As indicated above, the Is-Address-Writeable function creates a transactional region that performs a read operation first followed by a write operation with the value that was obtained by the read operation. If the write operation succeeds, then the page is known to have write permission. If the transaction aborts repeatedly, then the function concludes that page does not have write permission. Knowing write permission of the page helps detect malware's possible payload injection behavior.

As indicated above, the Is-Address-Executable function searches the page for an instruction that the function can then try to execute, to determine whether the permissions for the page make the page executable. In particular, the function searches for a return instruction, which should be easy to find on most or all executable pages. Then, after finding a return instruction, the function creates a transactional region, and within that transaction region (a) the function sets up the stack with a new return address to return control to the Is-Address-Executable function, and then (b) the function tries to execute a return instruction (e.g., a C3 opcode) on the page of the target address from LBR entry. Success proves that the page is executable, while a non-executable page will result in an aborted transaction. Consequently, after execution of the transactional region, if control gets returned to the return address on the stack, then the page is flagged as executable. But if the transaction aborts multiple times, the page is flagged as not executable. Thus, the transaction-based filter can use transaction hardware 140 to check page execution using only a few instructions and very low overhead. Additionally, if an attacker attempts to fool the transaction-based filter with a so-called "time of check to time of use" (TOCTOU) attack (e.g., if the malware attempts to modify the return instruction at the same time as the transaction-based filter attempts to execute that return instruction), or if the page data otherwise changes during execution, transaction hardware 140 will detecting the self-modifying code (SMC) condition and abort the transaction. However, as indicated above, the Is-Address-Executable function may try the transaction multiple times. A TOCTOU attack would be very unlikely to modify the return instruction during all of those tries.

The pseudocode above for the Is-Address-Executable function includes an example page-size mask of 0x0FFF, which would be suitable for a 16-bit address space. In a corresponding hypothetical example involving a target address of 0x000F, the search address may also be set to 0x000F, and the mask complement may be set to 0xF000. Then, the bitwise AND operator may change the search address to 0x000, and the address page limit may be set to 0x0FFF. However, as will be evident to one of ordinary skill in the art, the page-size mask and related items should be extended for larger address spaces.

Knowing whether or not a page is executable may be critical for correct code inspection. A conventional approach to determine whether a page is executable involves making a system call to the OS kernel. Such a system call may be very expensive, consuming a few thousand instruction cycles. Accordingly, avoiding system calls may save a few thousand instruction cycles per call.

As indicated above, the transaction-based filter may be fully implemented as part of a kernel driver. Consequently, transaction-based code inspection can be performed with significant overhead reduction, relative to other techniques for code inspection. For instance, the transaction-based filter may avoid many or most of the context switches that might otherwise be needed to transfer control to user-mode, embedded monitor software. For example, a conventional system might transfer control to embedded monitor software to check whether a page is readable, writeable, or executable. By contrast, the transaction-based filter may avoid such transfers for every anomalous event that the transaction-based filter identifies as a false positive.

Heuristic event handler 184 may use the techniques described herein to detect highly sophisticated code-reuse attacks. Those attacks may involve gadgets that use ROP, call-oriented programming (COP), and/or jump-oriented programming (JOP), for example. In addition, heuristic event handler 184 may provide real-time protection by analyzing application memory in runtime. In addition, heuristic event handler 184 may enjoy low performance overhead, due to efficient and fast filtering of the hardware alerts to eliminate the majority of the false positives. For instance, the overhead used by heuristic event handler 184 may have a performance impact of less than three percent, relative to a system with no software for detecting control flow attacks. In addition, heuristic event handler 184 may provide cross-platform support by relying on low-level platform data and OS-agnostic processing.

It should be understood that, even though the present disclosure refers primarily to distinct execution entities as processes, the present teachings may also be used with threads. Accordingly, unless the context indicates otherwise, references to execution entities as processes should be understood as also covering threads, when appropriate. For instance, the term "user-mode process" should also be understood as covering a user-mode thread.

Thus, as has been described, transaction-hardware-assisted code inspection provides safe and exception free memory access for monitored applications and processes without requiring OS system calls and services. The disclosed techniques may speed up and simplify the code inspection process, relative to other monitoring techniques, while also providing enhanced flexibility for integrating the hardware-heuristic-driven execution-analysis software stack into the target platform. For example, the entire heuristic event handler component can be implemented as a ring 0 driver, eliminating the need for context switching to an embedded user-mode component to perform code inspection.

The teachings of the present disclosure may be used to detect malware, and in particular to provide protection against code reuse attacks such as ROP. Heuristic counters may detect an instruction-level anomaly and generate a PMI in response. A heuristic event handler may then use transaction hardware to analyze the binary to determine if the anomalous event is due to a real exploit or is a false positive.

Although certain example embodiments are described herein, one of ordinary skill in the art will understand that those example embodiments may easily be divided, combined, or otherwise altered to implement additional embodiments. Likewise, expressions such as "an embodiment," "one embodiment," and "another embodiment" are meant to generally reference embodiment possibilities. Those expressions are not intended to limit the invention to particular embodiment configurations. As used herein, those expressions may reference the same embodiment or different embodiments, and those embodiments are combinable into other embodiments. In light of the principles and example embodiments described and illustrated herein, it will be recognized that the illustrated embodiments can be modified in arrangement and detail without departing from such principles.

As described above, a device may include instructions and other data which, when accessed by a processor, cause the device to perform particular operations. For purposes of this disclosure, instructions which cause a device to perform operations may be referred to in general as software. Software and the like may also be referred to as control logic. Software that is used during a boot process may be referred to as firmware, as may software that is stored in nonvolatile memory. Software may be organized using any suitable structure or combination of structures. Accordingly, terms like program and module may be used in general to cover a broad range of software constructs, including without limitation application programs, subprograms, routines, functions, procedures, drivers, libraries, data structures, processes, microcode, and other types of software components. Also, it should be understood that a software module may include more than one component, and those components may cooperate to complete the operations of the module. Also, the operations which the software causes a device to perform may include creating an operating context, instantiating a particular data structure, etc. Any suitable operating environment and programming language (or combination of operating environments and programming languages) may be used to implement software components described herein.

A medium which contains data and which allows another component to obtain that data may be referred to as a machine-accessible medium or a machine-readable medium. In one embodiment, software for multiple components is stored in one machine-readable medium. In other embodiments, two or more machine-readable media may be used to store the software for one or more components. For instance, instructions for one component may be stored in one medium, and instructions another component may be stored in another medium. Or a portion of the instructions for one component may be stored in one medium, and the rest of the instructions for that component (as well instructions for other components), may be stored in one or more other media. Similarly, software that is described above as residing on a particular device in one embodiment may, in other embodiments, reside on one or more other devices. For instance, in a distributed environment, some software may be stored locally, and some may be stored remotely. Similarly, operations that are described above as being performed on one particular device in one embodiment may, in other embodiments, be performed by one or more other devices.

Accordingly, alternative embodiments include machine-readable media containing instructions for performing the operations described herein. Such media may be referred to in general as apparatus and in particular as program products. Such media may include, without limitation, tangible non-transitory storage components such as magnetic disks, optical disks, RAM, read-only memory (ROM), etc., as well as processors, controllers, and other components that include data storage facilities. For purposes of this disclosure, the term "ROM" may be used in general to refer to nonvolatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. In some embodiments, some or all of the control logic for implementing the described operations may be implemented in hardware logic (e.g., as part of an integrated circuit chip, a programmable gate array (PGA), an application-specific integrated circuit (ASIC), etc.).

Additionally, the present teachings may be used to advantage in many different kinds of data processing systems. Such data processing systems may include, without limitation, accelerators, systems on a chip (SOCs), wearable devices, handheld devices, smartphones, telephones, entertainment devices such as audio devices, video devices, audio/video devices (e.g., televisions and set-top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. A data processing system may also be referred to as an apparatus. The components of a data processing system may also be referred to as apparatus.

Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Similarly, terms such as "line," "pin," etc. should be understood as referring to a wire, a set of wires, or any other suitable conductor or set of conductors. For instance, a bus may include one or more serial links, a serial link may include one or more lanes, a lane may be composed of one or more differential signaling pairs, and the changing characteristics of the electricity that those conductors are carrying may be referred to as signals on a line. Also, for purpose of this disclosure, the term "processor" denotes a hardware component that is capable of executing software. For instance, a processor may be implemented as a central processing unit (CPU), a processing core, or as any other suitable type of processing element. A CPU may include one or more processing cores, and a device may include one or more CPUs.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

What is claimed is:

1. A data processing system with for detecting control flow attacks, the data processing system comprising:
   a processor;
   a performance monitoring unit (PMU) in the processor;
   a heuristic event counter in the PMU;
   a last branch record (LBR) buffer in the processor;
   transaction hardware in the processor;
   memory responsive to the processor;
   a machine-readable medium responsive to the processor; and
   a heuristic event handler in the machine-readable medium, wherein the heuristic event handler, when executed by the processor, enables the processor to perform operations comprising:
   after a performance monitoring interrupt (PMI) was triggered by the heuristic event counter when the processor was executing a target program in user mode, and after the processor has automatically switched to kernel mode in response to the PMI, automatically performing preliminary analysis in kernel mode, without switching back to user mode, to determine whether heavyweight code analysis is warranted, wherein the preliminary analysis comprises:
   obtaining an instruction pointer (IP) for the target program from the LBR buffer;
   using the transaction hardware to determine whether the IP from the LBR buffer points to a readable page in the memory; and
   determining that heavyweight code analysis is not warranted in response to a determination that the page pointed to by the IP from the LBR buffer is not readable.

2. A data processing system according to claim 1, wherein the operation of using the transaction hardware to determine whether the IP from the LBR buffer points to a readable page in the memory comprises:
   attempting to read from the page and using the transaction hardware to prevent the attempted read from causing a memory exception.

3. A data processing system according to claim 1, wherein the heuristic event handler, when executed, performs further operations comprising:
   in response to a determination that heavyweight code analysis is not warranted, automatically clearing the PMI and switching the processor from kernel mode to user mode, to enable the target program to resume execution.

4. A data processing system according to claim 1, wherein the preliminary analysis that the heuristic event handler enables the data processing system to perform in kernel mode further comprises:
   determining that heavyweight analysis is not warranted, based on a branch mispredict bit from the LBR buffer.

5. A data processing system according to claim 1, wherein the preliminary analysis that the heuristic event handler enables the data processing system to perform in kernel mode further comprises:
   using the transaction hardware in the processor to determine whether the IP from the LBR buffer points to a writable page in the memory; and
   determining that heavyweight analysis is not warranted, based on a determination that the page pointed to by the IP from the LBR buffer is not writeable.

6. A data processing system according to claim 1, wherein the preliminary analysis that the heuristic event handler enables the data processing system to perform in kernel mode further comprises:
   using the transaction hardware in the processor to determine whether the IP from the LBR buffer points to an executable page in the memory; and
   determining that heavyweight analysis is not warranted, based on a determination that the page pointed to by the IP from the LBR buffer is not executable.

7. A data processing system according to claim 1, wherein the preliminary analysis that the heuristic event handler enables the data processing system to perform in kernel mode further comprises:
   searching a region of memory used by the target program for a suspicious code signature without switching to user mode and without calling any operating system functions.

8. A data processing system according to claim 1, wherein the heuristic event handler comprises a kernel driver.

9. A data processing system according to claim 1, wherein the preliminary analysis that the heuristic event handler enables the data processing system to perform in kernel mode further comprises:
   automatically adding the IP from the LBR buffer to an IP whitelist, in response to determining that heavyweight code analysis is not warranted; and subsequently using the IP whitelist to determine whether heavyweight code analysis is warranted after another PMI has been triggered.

10. An apparatus to enable a data processing system to detect control flow attacks, the apparatus comprising:
    a non-transitory machine-readable medium; and
    a heuristic event handler in the machine-readable medium, wherein the heuristic event handler, when executed by a processor of a data processing system, enables the data processing system to perform operations comprising:
    after a heuristic event counter in a performance monitoring unit (PMU) in the processor has triggered a performance monitoring interrupt (PMI) when the processor was executing a target program in user mode, and after the processor has switched to kernel mode in response to the PMI, automatically performing preliminary analysis in kernel mode, without switching back to user mode, to determine whether heavyweight code analysis is warranted, wherein the preliminary analysis comprises:
    obtaining an instruction pointer (IP) for the target program from a last branch record (LBR) buffer in the processor;
    using transaction hardware in the processor to determine whether the IP from the LBR buffer points to a readable page in memory of the data processing system; and
    determining that heavyweight code analysis is not warranted in response to a determination that the page pointed to by the IP from the LBR buffer is not readable.

11. An apparatus according to claim 10, wherein the operation of using the transaction hardware to determine whether the IP from the LBR buffer points to a readable page in the memory comprises:
    attempting to read from the page and using the transaction hardware to prevent the attempted read from causing a memory exception.

12. An apparatus according to claim 10, wherein the heuristic event handler enables the data processing system to perform further operations comprising:
    in response to a determination that heavyweight code analysis is not warranted, automatically clearing the PMI and switching the processor from kernel mode to user mode, to enable the target program to resume execution.

13. An apparatus according to claim 10, wherein the preliminary analysis that the heuristic event handler enables the data processing system to perform in kernel mode further comprises:
    determining that heavyweight analysis is not warranted, based on a branch mispredict bit from the LBR buffer.

14. An apparatus according to claim 10, wherein the preliminary analysis that the heuristic event handler enables the data processing system to perform in kernel mode further comprises:
    using the transaction hardware in the processor to determine whether the IP from the LBR buffer points to a writable page in the memory; and
    determining that heavyweight analysis is not warranted, based on a determination that the page pointed to by the IP from the LBR buffer is not writeable.

15. An apparatus according to claim 10, wherein the preliminary analysis that the heuristic event handler enables the data processing system to perform in kernel mode further comprises:
    using the transaction hardware in the processor to determine whether the IP from the LBR buffer points to an executable page in the memory; and
    determining that heavyweight analysis is not warranted, based on a determination that the page pointed to by the IP from the LBR buffer is not executable.

16. An apparatus according to claim 10, wherein the preliminary analysis that the heuristic event handler enables the data processing system to perform in kernel mode further comprises:
    searching a region of memory used by the target program for a suspicious code signature without switching to user mode and without calling any operating system functions.

17. An apparatus according to claim 10, wherein the heuristic event handler comprises a kernel driver.

18. An apparatus according to claim 10, wherein the preliminary analysis that the heuristic event handler enables the data processing system to perform in kernel mode further comprises:
    automatically adding the IP from the LBR buffer to an IP whitelist, in response to determining that heavyweight code analysis is not warranted; and
    subsequently using the IP whitelist to determine whether heavyweight code analysis is warranted after another PMI has been triggered.

19. A method for detecting control flow attacks, the method comprising:
    after a heuristic event counter in a processor of a data processing system has triggered a performance monitoring interrupt (PMI) when the processor was executing a target program in user mode, and after the processor has switched to kernel mode in response to the PMI, automatically performing preliminary analysis in kernel mode, without switching back to user mode, to determine whether heavyweight code analysis is warranted, vs/herein the preliminary analysis comprises:
    obtaining an instruction pointer (IP) for the target program from a last branch record (LBR) buffer in the processor;
    using transaction hardware in the processor to determine whether the IP from LBR buffer points to a readable page in memory of the data processing system; and
    determining that heavyweight code analysis is not warranted in response to a determination that the page pointed to by the IP from the LBR buffer is not readable.

20. A method according to claim 19 wherein the operation of using transaction hardware in the processor to determine whether the IP from the LBR buffer points to a readable page in the memory comprises:
    attempting to read from the page and using the transaction hardware to prevent the attempted read from causing a memory exception.

21. A method according to claim 19, further comprising:
    in response to a determination that heavyweight code analysis is not warranted, automatically clearing the PMI, switching the processor from kernel mode to user mode, and then resuming execution of the target program; and
    in response to a determining that heavyweight code analysis is warranted, automatically switching the processor from kernel mode to user mode and then using execution analysis software that is embedded in the target program to perform heavyweight code analysis in user mode.

22. A method according to claim 19, wherein the preliminary analysis that is performed in kernel mode further comprises:
  determining that heavyweight analysis is not warranted, based on a branch mispredict bit from the LBR buffer.

23. A method according to claim 19, wherein the preliminary analysis that is performed in kernel mode further comprises:
  using the transaction hardware in the processor to determine whether the IP from the LBR buffer points to a writable page in the memory; and
  determining that heavyweight analysis is not warranted, based on a determination that the page pointed to by the IP from the LBR buffer is not writeable.

24. A method according to claim 19, wherein the preliminary analysis that is performed in kernel mode further comprises:
  using the transaction hardware in the processor to determine whether the IP from the LBR buffer points to an executable page in the memory; and
  determining that heavyweight analysis is not warranted, based on a determination that the page pointed to by the IP from the LBR buffer is not executable.

25. A method according to claim 19, wherein the preliminary analysis that is performed in kernel mode further comprises:
  searching a region of memory used by the target program for a suspicious code signature without switching to user mode and without calling any operating system functions.

* * * * *